(No Model.)
E. ROYCE.
ROTARY PLOW AND STALK CUTTER.
No. 344,596. Patented June 29, 1886.
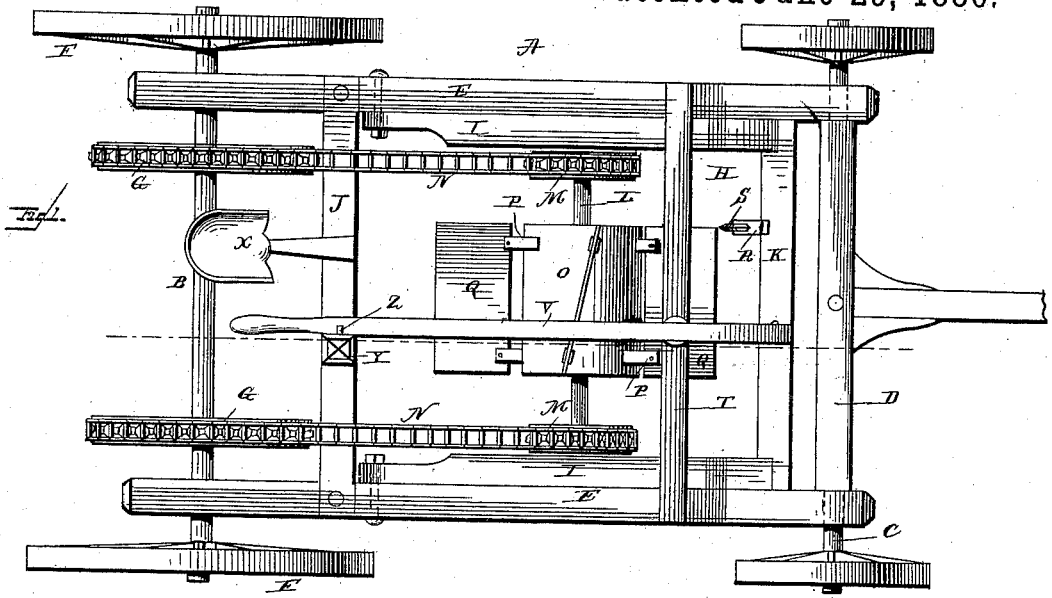
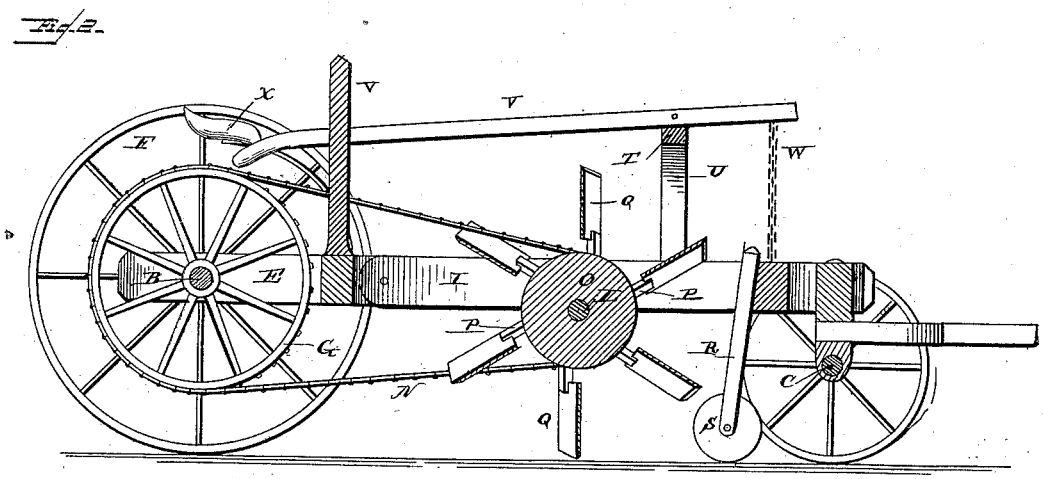
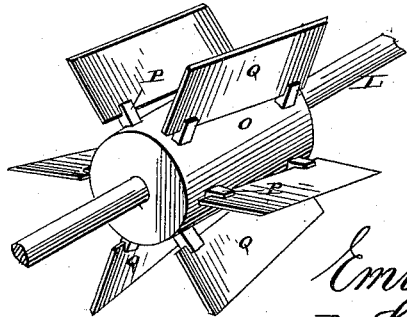
WITNESSES
INVENTOR
Emry Royce,
By Louis Bagger & Co.
Attorneys

UNITED STATES PATENT OFFICE.

EMRY ROYCE, OF PALISADE, DAKOTA TERRITORY.

ROTARY PLOW AND STALK-CUTTER.

SPECIFICATION forming part of Letters Patent No. 344,596, dated June 29, 1886.

Application filed March 22, 1886. Serial No. 196,174. (No model.)

*To all whom it may concern:*

Be it known that I, EMRY ROYCE, a citizen of the United States, and a resident of Palisade, in the county of Minnehaha and Territory of Dakota, have invented certain new and useful Improvements in Rotary Plows and Cornstalk-Cutters; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of my improved rotary plow or stalk-cutter. Fig. 2 is a longitudinal vertical sectional view of the same, and Fig. 3 is a perspective detail view of the revolving cylinder having the blades.

Similar letters of reference indicate corresponding parts in all the figures.

My invention has relation to that class of agricultural implements in which a revolving cylinder having radiating arms provided with cutters is connected to the drive-wheels, and revolved by them and journaled transversely in the frame of the implement, serving either as rotary plows or stalk-cutters; and it consists in the improved construction and combination of parts of such an implement, which may either be used as a rotary plow or spading-machine, or as a cornstalk-cutter, as hereinafter more fully described and claimed.

In the accompanying drawings, the letter A indicates a rectangular frame having the hind axle, B, secured in the rear ends of its side pieces, and having a swiveled front axle, C, pivoted to a cross-piece, D, pivoted at its ends in the forward ends of the side pieces E E of the frame. The hind axle is journaled in the rear ends of the side pieces, and is provided with the drive-wheels F F upon its ends, and two sprocket-wheels, G G, are secured upon the axle inside of the bearings in the side pieces.

A rectangular frame, H, has the rear ends of its side pieces I I pivoted upon the inner sides of the side pieces of the wheeled frame near the rear cross-piece, J, which connects the side pieces, and the forward ends of these side pieces of the pivoted frame are connected by a cross-piece, K.

A shaft, L, is journaled transversely in the middles of the side pieces of the pivoted frame, and the ends of the shaft are provided with sprocket-wheels M M, of a smaller diameter than the wheels upon the rear axle, and chains N N pass over these sprocket-wheels and the wheels upon the rear axle, so that the shaft may be revolved by the revolving rear axle when the machine is propelled across the ground. A hub, O, is secured upon the middle of this shaft, and has a number of radiating arms, P, projecting from it, placed obliquely in the periphery of the hub, and the outer ends of these arms have cutter-blades Q secured in them, which blades will stand obliquely to the central line of the implement.

A standard, R, is removably secured to the forward cross-piece of the pivoted frame, and may be adjusted at different heights, and the lower bifurcated end of this standard has a sharp-edged colter-wheel, S, journaled in it, which standard and wheel are in a line with one end of the revolving cutters.

A cross-bar, T, is secured upon the upper ends of two uprights, U U, upon the forward portions of the side pieces of the wheeled main frame, and a lever, V, is pivoted upon the middle of the cross-bar, having a cord or chain, W, attached to its forward end and to the forward cross-bar of the pivoted frame, while its rear end projects toward the seat X for the driver, which is secured upon the rear cross-bar of the main frame, and the said rear arm of the lever bears against the side of an upright, Y, upon the cross-bar, which upright is provided with laterally-projecting pins Z, between which the arm may be held, raising and lowering the forward end of the hinged frame and the cutter-blades as the rear arm is depressed or raised.

When the implement is to be used as a rotary plow, the frame is depressed so that the colter-wheel will cut a furrow, which may be spaded up and turned by the revolving obliquely-placed cutter-blades, while when the implement is to be used as a cornstalk-cutter the pivoted frame is raised so as to allow the cutter-blades to simply strike the surface of the ground without entering the same to any extent.

The blades may be made of any width, and when the implement is only used as a stalk-cutter the blades will preferably be secured to arms standing transversely to the frame, while for plowing or spading purposes the cutter-blades should stand obliquely to the frame.

Having thus described my invention, I claim and desire to secure by Letters Patent of the United States—

The combination of a rectangular frame having an axle journaled in its rear end, provided with drive-wheels and with sprocket-wheels, a frame pivoted at its rear end to the side rails of the wheeled frame, and having means for adjusting its forward end at different heights, a shaft journaled transversely in the hinged frame, and provided with sprocket-wheels connected to the wheels upon the drive-axle, a hub secured upon the shaft, cutter-blades arranged spirally upon said hub, a standard in the forward end of the hinged frame, provided with a colter-disk at its lower end, and means for raising or lowering the forward end of the frame, as and for the purpose shown and set forth.

In testimony that I claim the foregoing as my own I have hereunto affixed my signature in presence of two witnesses.

EMRY ROYCE.

Witnesses:
H. SIMPKINS,
ALBERT H. CASE.